United States Patent [19]

Sakata et al.

[11] Patent Number: 5,278,896
[45] Date of Patent: Jan. 11, 1994

[54] AUTOMATIC ANSWERING TELEPHONE APPARATUS

[75] Inventors: Toshihiko Sakata; Yoshihiro Shirakawa, both of Fukuoka, Japan

[73] Assignee: Matsushita Electric Industrial Co., Ltd., Japan

[21] Appl. No.: 888,441

[22] Filed: May 28, 1992

Related U.S. Application Data

[63] Continuation of Ser. No. 714,425, Oct. 12, 1991, abandoned.

[30] Foreign Application Priority Data

Jun. 13, 1990 [JP] Japan .................. 2-154777

[51] Int. Cl.⁵ .................. H04M 1/65; H04M 1/64
[52] U.S. Cl. .................. 379/70; 379/67; 379/82
[58] Field of Search .................. 379/85, 86, 70, 79, 379/82, 67; 360/72.2

[56] References Cited

U.S. PATENT DOCUMENTS

| | | | |
|---|---|---|---|
| 4,049,916 | 9/1977 | Danner | 379/82 |
| 4,421,954 | 12/1983 | Mita et al. | 379/82 |
| 4,469,919 | 9/1984 | Nakamura et al. | 379/73 |
| 4,654,485 | 3/1987 | Yamamoto | 379/77 X |
| 4,829,556 | 5/1989 | Hashimoto | 379/70 X |
| 4,833,704 | 5/1989 | Hashimoto | 379/70 X |
| 5,014,297 | 5/1991 | Morita et al. | 379/82 |

OTHER PUBLICATIONS

Consumer Reports-p. 49 (Jan. 1989).

Primary Examiner—John H. Wolff
Assistant Examiner—Joseph A. Rhoa
Attorney, Agent, or Firm—Parkhurst, Wendel & Rossi

[57] ABSTRACT

An automatic answering telephone apparatus for sending an out-going message through a telephone line and recording at least one incoming message on a magnetic tape using a tape recorder which can record a conversation between an operator and a conversation partner on the magnetic tape not in the automatic answering mode, the tape recorder further having rewinding, fast-forward winding and stop functions, and including: a position detector for detecting a tape travelling position; a memory for storing the detected tape traveling position such as to store the detected tape travelling position of the end of the latest incoming massage; a line status detector for detecting a change in status of the telephone line; and a controller responsive to an output of the line status detector, the detected tape travelling position, and the stored tape travelling position for positioning the magnetic tape to the stored tape travelling position using the fast-forward winding and the stop functions when the line status detector detects the change. The change may be caused by a ring signal, off-hook action, or busy state of the telephone line. The positioning may be carried out when rewinding or reproducing is being performed.

13 Claims, 2 Drawing Sheets

AUTOMATIC ANSWERING TELEPHONE APPARATUS

This is a continuation of application Ser. No. 07/714,425 filed Jun. 12, 1991, now abandoned.

BACKGROUND OF THE INVENTION

1. Field of the Invention

This invention relates to an automatic answering telephone apparatus.

2. Description of the Prior Art

An automatic answering telephone apparatus is known, which comprises a telephone, a first tape recorder for answering, and a second tape recorder for recording an incoming massage, wherein the second tape recorder can record an ordinary conversation between an operator and his conversation partner in response to a recording switch. In such prior art automatic answering telephone apparatus, the operator can playback the magnetic tape where the conversation is recorded after their communication.

However, in such prior art answering telephone apparatus, there is a problem as follows:

If a call occurs when the second tape recorder reproduces a recorded message, the second tape recorder stops reproducing automatically at an intermediate tape-travelling position of the recorded messages. Then, the caller begins to communicates with the operator. If the operator tries to record his conversation with the caller, he cannot record it immediately because the tape is stopped at a tape position where the messages had been recorded. That is, he must carry out the fast-forward to an end tape position of recorded messages and then, he must start to record. If not, message recorded in the tape which have not been heard are erased.

SUMMARY OF THE INVENTION

The present invention has been developed in order to remove the above-described drawbacks inherent to the conventional automatic answering telephone apparatus.

According to the present invention there is provided an automatic answering telephone apparatus for sending an out-going message through a telephone line and recording at least one incoming message on a magnetic tape using a tape recorder such that a plurality of the incoming messages are recorded serially in order of incoming in an automatic answering mode, the tape recorder further recording a conversation between an operator and a conversation partner on the magnetic tape while not in the automatic answering mode, the tape recorder further having rewinding, fast-forward winding and stop functions, comprising: a position detector for detecting a tape travelling position of the magnetic tape; an end position storing memory for storing the detected tape travelling position such as to store the detected tape travelling position of the end of the latest incoming message; a line status detector for detecting a change in status of the telephone line; and a controller responsive to an output of the line status detector, the detected tape travelling position, and the stored tape travelling position for positioning the magnetic tape to the stored tape travelling position using the fast-forward winding and the stop functions when the line status detector detects the change. The change may be caused by a ring signal, off-hook action, or a busy state of the telephone line. Whether positioning is carried out or not may be determined by whether reproducing or rewinding is being performed.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention of an automatic answering telephone with reference to drawings.

Figure 1:
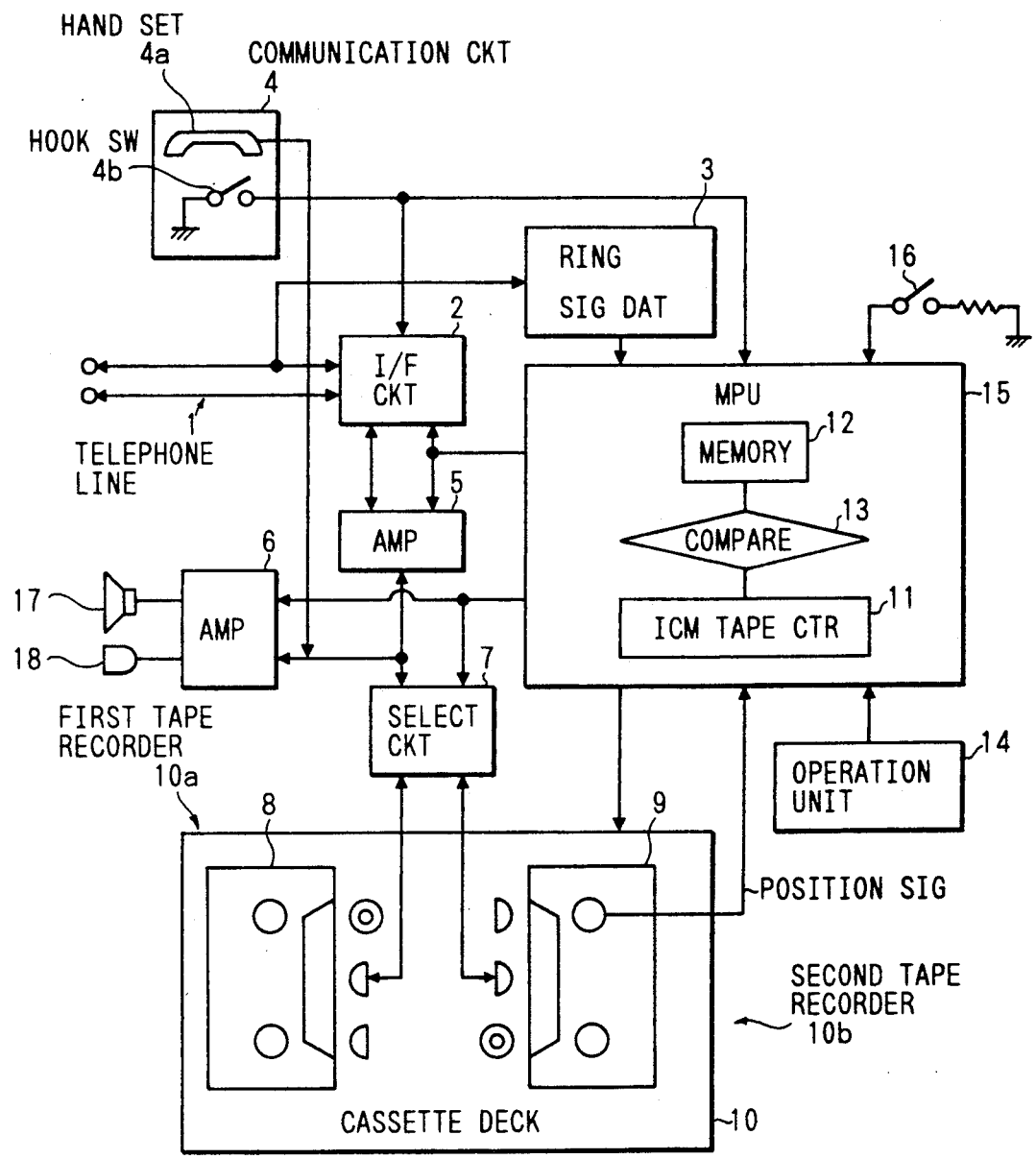
FIG. 1 is a block diagram of a first embodiment of the invention of the automatic answering telephone apparatus.

FIG. 1 is a block diagram of a first embodiment of the invention of the automatic answering telephone apparatus. In FIG. 1, the automatic answering telephone apparatus comprises an interface circuit 2 for communicating with an external telephone through a telephone line 1, a ring signal detection circuit 3 for detecting a ring signal sent through the telephone line, a communication circuit 4 for communicating with a caller or a conversation partner, which includes a hand set 4a and a hook switch 4b, a voice signal amplifier 5 including an output amplifier (not shown) for amplifying an out-going message (OGM) from a first tape recorder 10a and an input amplifier (not shown) for amplifying to record an incoming message, an output/input amplifying unit 6 including an microphone input amplifier used for recording the out-going message by the first tape recorder 10a and reproducing output amplifier for reproducing the incoming message from the second tape recorder 10b, a cassette deck 10 including the first tape recorder (first recording/reproducing unit) 10a for recording/reproducing an out-going message on a cassette magnetic tape (OGM tape) 8 and the second tape recorder (second recording/reproducing unit) 10b for recording/reproducing a message on/from a cassette magnetic tape (ICM tape) 9, a selection circuit 7 for selecting a voice signal from the first tape recorder 10a or the second tape recorder 10b, and a control circuit 15.

Out-going messages are recorded on the magnetic tape (OGR tape) 8 by the first tape recorder 10a. Incoming messages are recorded on the tape (ICM tape) 9 by the second tape recorder 10b. The control circuit 15 comprises a microprocessing unit (MPU) for controlling the interface circuit 2, the voice signal amplifier 5, the selection circuit 7, the cassette deck 10, and the input output amplifier 6 in response to the ring signal detection circuit 3, a mode switch 16, the hook switch 4b, a position signal from the cassette deck 10 and an operation unit 14. The MPU 15 includes a storing function (counter memory) 12 for storing a counting value of the tape end position of serially recorded messages, a counting function (ICM tape counter) 11 for counting rotations of a reel of the ICM tape 9, and a comparing function 13 for comparing the stored counting value with the present counting value.

The mode switch 16 produces a mode signal of an automatic answering mode or not. A speaker 17 reproduces the voice signal from the OGM tape 8 or ICM tape 9. The microphone 18 receives a sound of a voice from the operator to record it as an out-going message on the tape 8.

Figure 2:
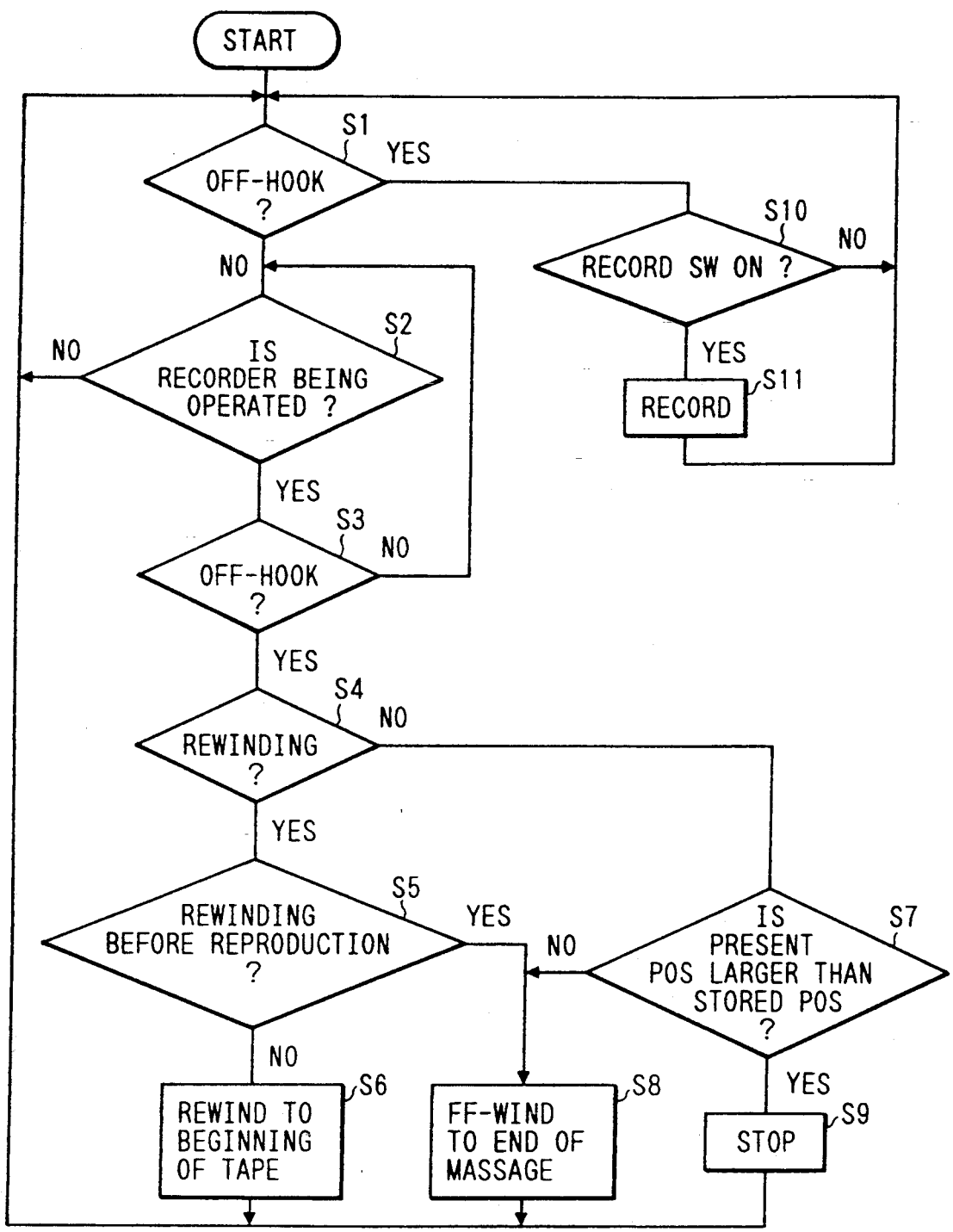
FIG. 2 shows a flow chart of the automatic answering telephone apparatus of the first embodiment.

Hereinbelow will be described operation of the automatic answering telephone apparatus with reference to FIG. 2. FIG. 2 shows a flow chart of the automatic answering telephone apparatus of this embodiment. The MPU 15 operates in accordance with the flow chart shown in FIG. 2.

This operation is executed after turn-on of the automatic answering telephone apparatus and when the mode switch 16 is turned to a non-automatic answering mode from the automatic answering mode. Moreover, it is assumed that the counter memory 12 of the MPU 15 has stored the count value of the end tape position of serially recorded messages by an well-known processing. The count value is obtained by an ICM tape counter 11 responsive to tape position signal from the second tape recorder 10b in accordance with a well-known process (not shown).

Processing starts at step S1 where the MPU 15 detects a condition of the hook switch 4b and makes a decision as to whether the hook switch 4b is OFF (OFF-HOOK) or ON (ON-HOOK). If the hook switch 4b is in OFF (YES), processing proceeds to step S10. If the hook switch 4b is in ON (NO), processing proceeds to step S2. In step S2, the MPU 15 makes a decision as to whether the tape recorder 10b is being operated or not. If NO, processing returns to step S1 and loops until the tape recorder 10b is operated or the hook switch is in OFF. In step S1, the answer is YES, i.e., the hook switch is turned to OFF, processing proceeds to step S10 where a decision is made as to whether a record switch for causing the recorder 10b to be in the recording mode is turn on. IF YES, the MPU 15 produces a command signal for recording a conversation between the operator and his conversation partner by the tape recorder 10b. Then, processing returns to step S1. In step S10, if the answer is NO, processing returns to step S1 directly.

Here, operation in connection with the ICM tape 9 will be described. the ICM tape 9 is reproduced in response to turn-on of a message reproduction switch (not shown) of the operation unit 14. When the MPU 15 detects the turn-on of the message reproduction switch, the MPU 15 produces a command signal of rewinding of ICM tape 9 at first. During rewinding, the ICM tape counter 11 carries out down-counting. When the MPU 15 detects the beginning of the ICM tape 9 by stop of the down-counting, it switches the second tape recorder 10b to a reproducing mode. Then, the automatic answering telephone apparatus reproduces messages recorded in the ICM tape 9 from the speaker 17 through the selection circuit 7 and the output amplifier of the input/output amplifier 6. During reproduction, the ICM tape counter 11 carries out up-counting and the MPU 15 compares the present count with the stored counting value of messages. If the present count value is the same as the stored value, the MPU 15 produces a command signal of stopping of reproduction to the second tape recorder 10b. This sequence is reproduction of the ICM tape 9.

When the MPU 15 detects the turn-on of the rewinding switch of the operation unit 14, the MPU 15 produces a command signal of rewinding of the ICM tape 9. During rewinding, the ICM tape counter 11 carries out down-counting. When the MPU 15 detects the beginning of the ICM tape 9 by stop of the down-counting, it stops rewinding operation. This sequence is rewinding operation of ICM tape 9.

Operation when OFF-HOOK is detected by the MPU 15 in the reproduction and rewinding operations will be described with reference to FIG. 2. In step S2, if the answer is YES, processing proceeds to step S3. In step S3, the MPU 15 detects whether the hook switch 4a is in OFF. If NO, processing returns to step S2. If YES, processing proceeds to step S4.

In step S4, a decision is made as to whether the ICM tape 9 is being rewound. If YES, processing proceeds to step S5. In step S5, a decision is made as to whether the rewinding is previously performed for production. If NO, processing proceeds to step S6 where the MPU 15 stops rewinding when the beginning of the ICM tape is detected. Then, processing returns to step S1. In step S5, if the answer is YES, processing advances to step S8 where the MPU 15 produces a command signal for winding the ICM tape 9 in fast-forward direction to the end position of the serially recorded messages with reference to the stored counting value. Then, processing returns to step S1. In step S4, if the answer is NO, processing proceeds to step S7 where the MPU 15 makes a decision as to whether the present tape position value is larger than the stored counting value, i.e., the end position of messages. If, the present tape position value is larger than the stored counting value, processing proceeds to step S9 where the MPU 15 produces a command signal of stopping the second tape recorder 10b. In step S7, when the present value is not larger than the stored counting value, processing advances to step S8 where the MPU 15 carries fast-forward winding of the ICM tape 9 to the tape end position of the serially recorded messages.

In steps S7 and S9, if the present tape position is larger than the stored counting value, the tape recorder 10b is stopped immediately because there is no possibility that the recorded message are erased.

After processing of steps S6, S8 and S9, when the record switch is in ON, the MPU 15 produces a command signal of recording to the recorder 10b and switches the interface circuit 2, the voice signal amplifier 5, and the tape selection circuit 7 to record the conversation, in step S11.

In the above-mentioned embodiment, various decisions are made before tape positioning to the end of message. However, there is another embodiment where operation is simplified. In FIG. 2, if the answer is NO, in step S1, processing can proceed to step S7 directly. In other words, steps 2–6 can be omitted. On the other hand, steps S1, S7, S8, S9, S10, and S11 are left.

Operation of the above-mentioned another embodiment will be described.

In step S1, OFF-HOOK action is detected by the MPU 15. If the answer is NO, processing directly proceeds to step S7 where the MPU 15 makes a decision as to whether the present tape position is larger than the stored counter value, i.e., end position of messages. If, the present tape position is larger than the stored counter value, processing proceeds to step S9 where the MPU 15 produces a command signal of stopping the tape recorder 10b. In step S7, the present value is not larger than the stored value, processing advances to step S8 where the MPU 15 carries out fast-forward winding of the ICM tape 9.

In steps S7 and S9, if the present tape position is larger than the stored counting value, the cassette deck 10 is stopped immediately because there is no possibility that the recorded messages are erased.

After processing of steps S6, S8 and S9, the MPU 15 produces a command signal of recording to the tape recorder 10b and switches over the interface circuit 2, the voice signal amplifier 5, and the tape selection circuit 7 to record the voice signal from the telephone line 1, in step S11.

In the above-mentioned embodiment, the automatic answering telephone apparatus is described as an automatic answering apparatus built in a telephone apparatus. However, the automatic answering apparatus and the telephone apparatus may be provided separately and connected to the same telephone line. In such case, OFF-HOOK of the telephone can be detected by a voltage drop of the telephone line.

Moreover, tape-positioning is carried out when OFF-HOOK is detected when the tape recorder 10b is operated. However, it is essentially sufficient that the MPU 15 prevents the automatic answering telephone apparatus from recording a message over the recorded message when start of communication is detected. Further, tape-positioning is carried out when ON-HOOK is detected during the tape recorder 10b is operated. Moreover if a hand-free communication mode is provided, the tape-positioning is carried out in response to the hand-free communication key. Moreover, the ring signal can be used for start of tape-positioning. That is, if the ring signal is received while the ICM tape 9 is being rewound, i.e., when a change in the telephone line is detected, tape-positioning can be executed. Further, tape-positioning is also carried out when the loop current is detected because a loop current flows in the telephone line in the OFF-HOOK condition.

What is claimed is:

1. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding and stop functions, said automatic telephone answering apparatus further comprising:
    (a) position detection means for detecting a tape travelling position of said second magnetic tape;
    (b) end position storing means for storing said detected tape traveling position such as to store said detected tape travelling position of an end of a most recently received incoming message;
    (c) line status detection means for detecting the position of a telephone hook switch of a telephone associated with said automatic telephone answering apparatus;
    (d) a switch responsive to a manual operation for producing a mode signal indicative of either of said automatic answering mode and a non-automatic answering mode; and;
    (e) control means responsive to an output of said line status detection means, said detected tape travelling position, said mode signal, and said stored tape travelling position for positioning said second magnetic tape to said stored tape travelling position using said fast-forward winding and said stop functions in said non-automatic answering mode when said line status detection means detects that said telephone line is in use in order to make it possible to record said conversation between said operator and said conversation partner on said second magnetic tape after said most recently received incoming message.

2. An automatic telephone answering apparatus as claimed in claim 1, further comprising rewind detection means responsive to said tape recorder for detecting whether said rewinding function is performed,
    wherein said control means further responds to said rewind detection means and positions said magnetic tape when said rewinding function is performed.

3. An automatic telephone answering apparatus as claimed in claim 1, further comprising reproduction detection means responsive to said tape recorder for detecting whether a reproducing function is performed,
    wherein said control means further responds to said reproduction detection means and positions said magnetic tape when said reproducing function is performed.

4. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding, and stop functions, said automatic telephone answering apparatus further comprising:
    (a) position detection means for detecting a tape travelling position of said second magnetic tape;
    (b) end position storing means for storing said detected tape traveling position such as to store said detected tape travelling position of an end of a most recently received incoming message;
    (c) off-hook detection means for detecting whether a hook switch of a telephone associated with said automatic telephone answering apparatus is released;
    (d) a switch responsive to a manual operation for producing a mode signal indicative of either of said automatic answering mode and a non-automatic answering mode; and;
    (e) control means responsive to an output of said off-hook detection means, said detected tape travelling position, said mode signal, and said stored tape travelling position for positioning said second magnetic tape to said stored tape travelling position using said fast-forward winding an said stop functions in said non-automatic answering mode when said off-hook detection means detects that said hook switch is in an off position in order to make it possible to record said conversation between said operator and said conversation partner on said second magnetic tape after said most recently received incoming message.

5. An automatic telephone answering apparatus as claimed in claim 4, further comprising rewind detection means responsive to said tape recorder for detecting whether said rewinding function is performed, wherein said control means further responds to said rewind detection means and positions said magnetic tape when said rewinding function is performed.

6. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding and stop functions, said automatic telephone answering apparatus further comprising:
  (a) position detection means for detecting a tape travelling position of said second magnetic tape;
  (b) end position storing means for storing said detected tape travelling position such as to store said detected tape travelling position of an end of a most recently received incoming message;
  (c) ring signal detection means for detecting a ring signal from said telephone line
  (d) a switch responsive to a manual operation for producing a mode signal indicative of either of said automatic answering mode and a non-automatic answering mode; and;
  (e) control means responsive to said ring signal, said detected tape travelling position, said mode signal, and said stored tape travelling position for positioning said magnetic tape to said stored tape travelling position using said fast-forward winding and said stop functions in said non-automatic answering mode when said ring signal detection means detects said ring signal in order to make it possible to record said conversation between said operator and said conversation partner on said second magnetic tape after said most recently received incoming message.

7. An automatic telephone answering apparatus as claimed in claim 6, further comprising rewind detection means responsive to said tape recorder for detecting whether said rewinding function is performed,
  wherein said control means further responds to said rewind detection means and positions said magnetic tape when said rewinding function is performed.

8. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding and stop functions, said automatic telephone answering apparatus further comprising:
  (a) position detection means for detecting a tape travelling position of said second magnetic tape;
  (b) end position storing means for storing said detected tape travelling position such as to store said detected tape travelling position of an end of a most recently received incoming message;
  (c) line status detection means for detecting a change in status of said telephone line;
  (d) a switch responsive to a manual operation for producing a mode signal indicative of either of said automatic answering mode and a non-automatic answering mode; and;
  (e) control means responsive to an output of said line status detection means, said detected tape travelling position, said mode signal, and said stored tape travelling position for positioning said second magnetic tape to said stored tape travelling position using said fast-forward winding and said stop functions in said non-automatic answering mode when said line status detection means detects said change in order to make it possible to record said conversation between said operator and said conversation partner on said second magnetic tape after said most recently received incoming message.

9. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further effecting rewinding, fast-forward winding, reproducing, and stop functions in response to control signals and manual operation by said operator, said automatic telephone answering apparatus further comprising:
  (a) position detection means for detecting a tape travelling position of said second magnetic tape;
  (b) end position storing means for storing said detected tape travelling position such as to store said detected tape travelling position of an end of a most recently received incoming message;
  (c) a switch responsive to a manual operation for producing a mode signal indicative of either of said automatic answering mode and a non-automatic answering mode;
  (d) line status detection means for detecting a change in status of said telephone line;
  (e) operation status detection means for detecting whether or not said tape recorder is effecting any of said rewinding, said fast-forward winding, and said reproducing mode is effected in response to said manual operation; and
  (f) control means responsive to an output of said line status detection means, said detected tape travelling position, said operation status detection means, said mode signal and said stored tape travelling position for positioning said magnetic tape to said stored tape travelling position using said fast-forward winding and said stop functions through said control signals in said non-automatic answering mode when said line status detection means detects said change and any of said rewinding, said fast-forward winding, and said reproducing functions is effected in order to make it possible to record said conversation between said operator and said conversation partner on said second magnetic tape after said most recently received incoming message.

10. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding and stop functions, said automatic telephone answering apparatus further comprising:

(a) position detection means for detecting a tape travelling position of said second magnetic tape;

(b) end position storing means for storing said detected tape traveling position such as to store said detected tape travelling position of an end of a most recently received incoming message;

(c) line status detection means for detecting the position of a telephone hook switch of a telephone associated with said automatic telephone answering apparatus; and (d) control means responsive to an output of said line status detection means, said detected tape travelling position, and said stored tape travelling position for always positioning said second magnetic tape to said stored tape travelling position using said fast-forward winding and said stop functions when said line status detection means detects that said telephone line is in use in order to make it possible to record said conversation between said operator and said conversation partner on said second magnetic tape after said most recently received incoming message.

11. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding, and stop functions, said automatic telephone answering apparatus further comprising:

(a) position detection means for detecting a tape travelling position of said second magnetic tape;

(b) end position storing means for storing said detected tape traveling position such as to store said detected tape travelling position of an end of a most recently received incoming message;

(c) off-hook detection means for detecting whether a hook switch of a telephone associated with said automatic telephone answering apparatus is released; and (d) control means responsive to an output of said off-hook detection means, said detected tape travelling position, and said stored tape travelling position for always positioning said second magnetic tape to said stored tape travelling position using said fast-forward winding an said stop functions when said off-hook detection means detects that said hook switch is in an off position in order to make it possible to record said conversation between said operator and said conversation partner on said second magnetic tape after said most recently received incoming message.

12. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding and stop functions, said automatic telephone answering apparatus further, comprising:

(a) position detection means for detecting a tape travelling position of said second magnetic tape;

(b) end position storing means for storing said detected tape travelling position such as to store said detected tape travelling position of an end of a most recently received incoming message;

(c) ring signal detection means for detecting a ring signal from said telephone line (d) control means responsive to said ring signal, said detected tape travelling position, and said stored tape travelling position for always positioning said magnetic tape to said stored tape travelling position using said fast-forward winding and said stop functions when said ring signal detection means detects said ring signal in order to make it possible to record said conversation between said operator and said conversation partner on said second magnetic tape after said most recently received incoming message.

13. An automatic telephone answering apparatus comprising: means for sending an out-going message recorded on a first magnetic tape through a telephone line and recording incoming messages on a second magnetic tape using a tape recorder such that a plurality of said incoming messages are recorded serially in order of arrival in an automatic answering mode, said tape recorder having a further mode for recording a conversation between an operator and a conversation partner on said second magnetic tape, said tape recorder further having rewinding, fast-forward winding and stop functions, said automatic telephone answering apparatus further comprising:

(a) position detection means for detecting a tape travelling position of said second magnetic tape;

(b) end position storing means for storing said detected tape travelling position such as to store said detected tape travelling position of an end of a most recently received incoming message;

(c) line status detection means for detecting a change in status of said telephone line;

(d) control means responsive to an output of said line status detection means, said detected tape travelling position, and said stored tape travelling position for always positioning said second magnetic tape to said stored tape travelling position using said fast-forward winding and said stop functions when said line status detection means detects said change in order to make it possible to record said conversation between said operator and said conversation partner on said second magnetic tape after said most recently received incoming message.

* * * * *